United States Patent
Beaudoin et al.

(10) Patent No.: US 9,657,993 B2
(45) Date of Patent: May 23, 2017

(54) SOLID AGGLOMERATE OF FINE METAL PARTICLES COMPRISING A LIQUID OILY LUBRICANT AND METHOD FOR MAKING SAME

(71) Applicant: Gestion McMarland Inc., Saint-Joseph-de-Sorel (CA)

(72) Inventors: Michel Beaudoin, Sorel-Tracy (CA); Raymond Bernier, Becancour (CA); Martin Gagne, Sorel-Tracy (CA); Marie-Josee Robichaud, Becancour (CA)

(73) Assignee: GESTION MCMARLAND INC., Saint-Joseph-de-Sorel, Quebec (CA)

( * ) Notice: Subject to any disclaimer, the term of this patent is extended or adjusted under 35 U.S.C. 154(b) by 135 days.

(21) Appl. No.: 14/627,130

(22) Filed: Feb. 20, 2015

(65) Prior Publication Data
US 2016/0244859 A1    Aug. 25, 2016

(51) Int. Cl.
*C22B 1/16* (2006.01)
*C22B 1/24* (2006.01)
(Continued)

(52) U.S. Cl.
CPC .......... *F27D 3/0024* (2013.01); *C21C 7/0006* (2013.01); *C22B 1/16* (2013.01); *C22B 1/24* (2013.01); *C22B 1/244* (2013.01)

(58) Field of Classification Search
CPC .......... C22B 1/16; C22B 1/244; C21C 7/0006
See application file for complete search history.

(56) References Cited

U.S. PATENT DOCUMENTS 3,945,819 A * 3/1976 Easwaran ................ C21C 1/02
                                                    428/567
4,116,679 A    9/1978 Pietsch
(Continued)

FOREIGN PATENT DOCUMENTS

CA    2571777         3/2010
GB    2 173 213      10/1986
WO    2014/133447    9/2014

OTHER PUBLICATIONS

Offer for sale to potential client(s), Quebec, Canada; Feb. 23, 2014; Tremblay, M.; Briques de fer pré-réduit (DRI): Matériau de charge pour convertisseur.
(Continued)

*Primary Examiner* — George Wyszomierski
*Assistant Examiner* — Tima M McGuthry Banks
(74) *Attorney, Agent, or Firm* — Wenderoth, Lind & Ponack, L.L.P.

(57) ABSTRACT

Described are solid agglomerates of fine metal particles and methods for manufacturing same. A liquid oily lubricant is used in the manufacture of the solid agglomerates. The manufacturing comprises blending fine metal particles with the liquid oily lubricant and compacting the oily metallic mixture obtained to desired solid form. Advantageously, the solid agglomerates possess a desirable density, a suitable resistance to crumbling and dusting during handling, and they can resist to high temperature and to humidity. Solid agglomerated metal products, according to the invention, may be useful for different purposes such as quality charge material for steel plants, blast furnaces and foundries.

25 Claims, 6 Drawing Sheets

(51) Int. Cl.
*C21C 7/00* (2006.01)
*F27D 3/00* (2006.01)
*C22B 1/244* (2006.01)

(56) References Cited

U.S. PATENT DOCUMENTS

| | | | |
|---|---|---|---|
| 4,865,642 A * | 9/1989 | Huddleston | C22B 1/244 75/313 |
| 5,147,452 A | 9/1992 | Anderson et al. | |
| 5,885,328 A | 3/1999 | Markarian et al. | |
| 6,342,089 B1 | 1/2002 | McGaa | |
| 6,413,471 B1 | 7/2002 | Kamikawa et al. | |
| 6,451,082 B1 | 9/2002 | Ozaki et al. | |
| 6,451,084 B1 | 9/2002 | Petrey, Jr. | |
| 6,533,836 B2 | 3/2003 | Uenosono et al. | |
| 6,802,886 B2 | 10/2004 | Hoffman et al. | |
| 6,860,918 B2 | 3/2005 | Ozaki et al. | |
| 8,439,987 B2 * | 5/2013 | Harada | B30B 11/16 44/550 |
| 8,641,799 B2 | 2/2014 | Boehm et al. | |
| 2002/0152839 A1 * | 10/2002 | Aota | C22B 1/243 75/230 |
| 2002/0152843 A1 | 10/2002 | Ishihara et al. | |
| 2005/0178240 A1 * | 8/2005 | Matsuda | C22B 1/248 75/318 |
| 2008/0196548 A1 | 8/2008 | Bieniosek | |
| 2009/0169413 A1 | 7/2009 | Ahsan et al. | |
| 2011/0101262 A1 | 5/2011 | Kuroda et al. | |
| 2013/0192421 A1 * | 8/2013 | Meynerts | C22B 1/24 75/306 |
| 2013/0291682 A1 * | 11/2013 | Hendrickson | C22B 1/16 75/316 |
| 2014/0260799 A1 | 9/2014 | Arvidsson et al. | |

OTHER PUBLICATIONS

Offer for sale to potential client(s), Quebec, Canada; Feb. 24, 2014; Tremblay, M.; Briques de fer pré-réduit (DRI): Matériau de charge pour cubilot.

Offer for sale to potential client(s), Quebec, Canada; Feb. 28, 2014; Tremblay, M.; Briques de fer pré-réduit (DRI): Matériau de charge pour les fours à arc électrique (aciéries).

Offer for sale to potential client(s), Quebec, Canada; Feb. 28, 2014; Tremblay, M.; Direct Reduced Iron (DRI) Bricks: A Charge Material for Converter.

Offer for sale to potential client(s), Quebec, Canada; Feb. 28, 2014; Tremblay, M.; Direct Reduced Iron (DRI) Bricks: A Charge Material for Cupola.

Offer for sale to potential client(s), Quebec, Canada; Feb. 28, 2014; Tremblay, M.; Direct Reduced Iron (DRI) Bricks: A Charge Material for Electric Arc Furnace.

First sale of bricks manufactured according to the methods described in the present application, Quebec, Canada; Mar. 17, 2014.

* cited by examiner

|        | Length     | Width      | Thickness range   |
|--------|------------|------------|-------------------|
| Type A | 227-232 mm | 75-77 mm   | From 40 to 80 mm  |
| Type B | 150-155 mm | 75-77 mm   | From 50 to 90 mm  |
| Type C | 200-205 mm | 138-143 mm | From 40 to 80 mm  |

SOLID AGGLOMERATE OF FINE METAL PARTICLES COMPRISING A LIQUID OILY LUBRICANT AND METHOD FOR MAKING SAME

FIELD OF THE INVENTION

The invention relates to the field of metallurgy and more particularly to the recycling of steel mill wastes and/or by-products, powders derived from direct reduction processes of iron oxides (DRI), metallic powders and the manufacture of charge materials for steel plants, blast furnaces and foundries.

BACKGROUND OF THE INVENTION

Manufacturing of metallic products generates a lot of waste and by-products; for instance, large quantities of steel dusts and other wastes associated with modern methods of steel production. Most steelmakers are searching for ways to recycle steel dusts, not only to lower the amount of environmentally hazardous materials, but also to allow steelmakers to reclaim valuable minerals otherwise lost as waste.

Steelmakers have developed methods of recycling steel mill waste by collecting the waste, combining the waste with a binder and compacting the combination into a solid agglomerate. The agglomerate may later be charged to a steelmaking furnace. Various types of binders have been suggested including: a water insoluble elastomeric polymer (U.S. Pat. No. 5,147,452), oleic acid, spindle oil, turbine oil and zinc stearate (U.S. Pat. No. 6,533,856), liquid sodium silicate, hydrated lime, powdered pitch and water (U.S. Pat. No. 4,116,679) and cellulose fiber (U.S. Pat. No. 6,802,886). Additional known binding materials for agglomerating fine metal particles include molasses and lime, and dry sulfite and water.

However, existing methods are not optimal, are expensive and/or inefficient for different reasons. For instance some existing methods may require a sintering step or an additional treating step which causes oxidation of the fines which thereupon requires an additional reduction step. Some methods may require expensive binders and/or require mixing the binder under heating. Some other methods are limited with respect to the type and/or purity of the iron-based powders that can be used. In addition, the solid agglomerate product obtained using these known methods may not have an acceptable resistance to crumbling, dusting or high temperature.

The present invention addresses these needs as it relates to a solid agglomerate of metal particles and methods of manufacturing same. In embodiments, the solid agglomerates possess a desirable density, a suitable resistance to crumbling and dusting during handling, which can resist to high temperature and resist to humidity.

Additional features of the invention will be apparent from review of the disclosure, figures, and description of the invention below.

BRIEF SUMMARY OF THE INVENTION

According to a first aspect, the invention is concerned with solid agglomerate of metal particles comprising fine metal particles and a liquid oily lubricant, wherein the fine metal particles and liquid oily lubricant are compacted together to form the solid agglomerate.

In embodiments, the liquid oily lubricant is a mineral oil, a vegetable oil or an animal oil. In one preferred embodiment, the liquid oily lubricant is canola oil. In embodiments, the liquid oily lubricant coat the metal particles and it is present at about 2.5 to about 10% w/w, or at about 3 to about 5% w/w, or at about 3.5 to about 4% w/w.

In one embodiment, the fine metal particles comprise Direct Reduced Iron (DRI). In one embodiment the fine metal particles comprises at least 70% total iron, preferably least 80% total iron. In one embodiment, the fine metal particles comprise at least 0.5% w/w metallic iron. The fine metal particles may comprise a ferroalloy, graphite, Si and/or mixtures thereof.

In one embodiment, the fine metal particles consist of a mixture of particles having a size of about 600 microns or less.

In one embodiment, the fine metal particles consist of a mixture of particles having a size of about 200 microns or less. In one embodiment, the fine metal particles consist of a mixture of particles, the mixture having no more than 30% w/w of its particles with a size greater that about 200 microns.

In one embodiment, the solid agglomerate has a density of about 4 g/cm$^3$ to about 6 g/cm$^3$. Preferably, the agglomerate can resist to crumbling and dusting during handling. Preferably, the agglomerate can retain its physical integrity at a temperature up to 1200° C. Preferably, the agglomerate has a lower humidity index compared to briquettes comprising lime and molasses.

The agglomerate may have the shape of a briquette, a brick, a ball, a block and a puck. In embodiments, the agglomerate is used as a charge material for a steel plant, a blast furnace and/or a foundry.

According to another aspect, the invention is concerned with a method for agglomerating fine metal particles, comprising:

mixing fine metal particles with a liquid oily lubricant to obtain an oily metallic mixture;
pouring the oily metallic mixture into a cavity or mold; and
compacting the oily metallic mixture into a desired shape to obtain an agglomerate in a solid form.

In embodiments, the agglomerate in a solid form has a shape selected from the group consisting of a briquette, a brick, a ball, a block and a puck.

According to one embodiment, the oily metallic mixture has a volume and the compacting reduces said volume by a factor of about two or more. In one embodiment, the oily ferrous mixture has a first density, and wherein the compacting increases said first density by a factor of about two or more. In one embodiment, the first density is about 2 g/cm$^3$ and the compacting increases said first density to a second density greater than about 4 g/cm$^3$.

In one embodiment, the compacting comprises cold pressing at ambient temperature. In one embodiment, the compacting comprises applying, to the oily ferrous mixture, a pressure of at least about 145 MPa, for instance a pressure between about 145 MPa and about 350 MPa. Typically, the pressure is maintained for at least 1 second. In one embodiment, the compacting comprises a degassing step.

According to another aspect, the invention is concerned with a method for manufacturing a solid ferrous brick, comprising:

mixing fine powdered ferrous material with an oil to obtain an oily ferrous mixture, wherein said fine powdered ferrous material comprises at least 50% metallic iron derived from direct reduction processes of iron oxides (DRI);
pouring the oily ferrous mixture into a mold; and applying a pressure of at least 145 MPa to the oily ferrous mixture in the mold to obtain said solid ferrous brick.

According to a further aspect, the invention is concerned with a method to feed a steelmaking furnace or a foundry furnace comprising:

providing an agglomerate or a brick as described above; and charging said agglomerate or brick to a molten metal bath of a steelmaking furnace or foundry furnace.

Additional aspects, advantages and features of the present invention will become more apparent upon reading the following non-restrictive description of preferred embodiments which are exemplary and should not be interpreted as limiting the scope of the invention.

BRIEF DESCRIPTION OF THE DRAWINGS

FIG. 1A=magnification at 575×; FIG. 1B=magnification at 1150×.

FIG. 4A=Type A; FIG. 4B=Type B; FIG. 4C=Type C; FIG. 4D=Type D.

DETAILED DESCRIPTION OF PREFERRED EMBODIMENTS

In the following description of the embodiments, references to the accompanying drawings are an illustration of examples by which the invention may be practiced. It will be understood that other embodiments may be made without departing from the scope of the invention disclosed.

In accordance with the invention, a liquid oily lubricant is used in the manufacture of a solid agglomerate of fine metal particles. As described herein, manufacturing of the solid agglomerated metal product of the invention comprises mixing or blending, preferably to homogeneity, fine metal particles with a liquid oily lubricant and compacting the mixture so obtained to a desired solid form (e.g. a brick, briquette or the like). Solid agglomerated metal products, according to the invention, may be useful for different purposes such as quality charge material for steel plants, blast furnaces and foundries.

The principles of the present invention can be applied to any suitable type of fine metal particles. As used herein, the term "fine metal particles" refers to a mixture of metal particles with a total iron content of at least 50% w/w and having a maximum size of less than about 1 mm (1000 microns). In embodiments, the maximum size of the particles is 600 microns or 200 microns. As used herein, the term "total iron", refers to a total amount of iron in a material that may include iron oxides, metallic iron, ferroalloy(s) and mixtures thereof. As used herein, the term "maximum size", refers to a normal distribution size of particles sieved through the mesh of a screen of a given size. Tables 2 and 3 hereinafter provide non-limitative examples of such sieving.

In one embodiment, the fine metal particles consist of a mixture of particles of various sizes wherein less than 30% w/w of the particles in the mixture have a size above 200 microns. In one embodiment, the fine metal particles consist of a mixture of particles having less than about 600 microns, with no more than 30% w/w of the particles with a size greater than about 200 microns. In another embodiment, there is no more than 20% w/w of the particles in the mixture with a size greater than about 200 microns. In one embodiment, the fine metal particles comprise 100% of particles having a size of less than 200 microns.

Figure 1A:
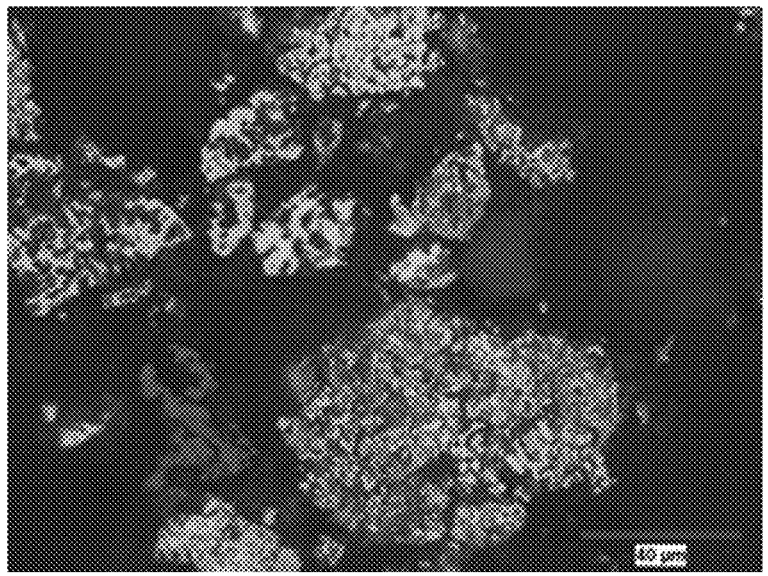
FIGS. 1A-1B display pictures showing typical microstructures of particles composed of ferrite, graphite and carbides as seen with an optical microscope.
Figure 1B:
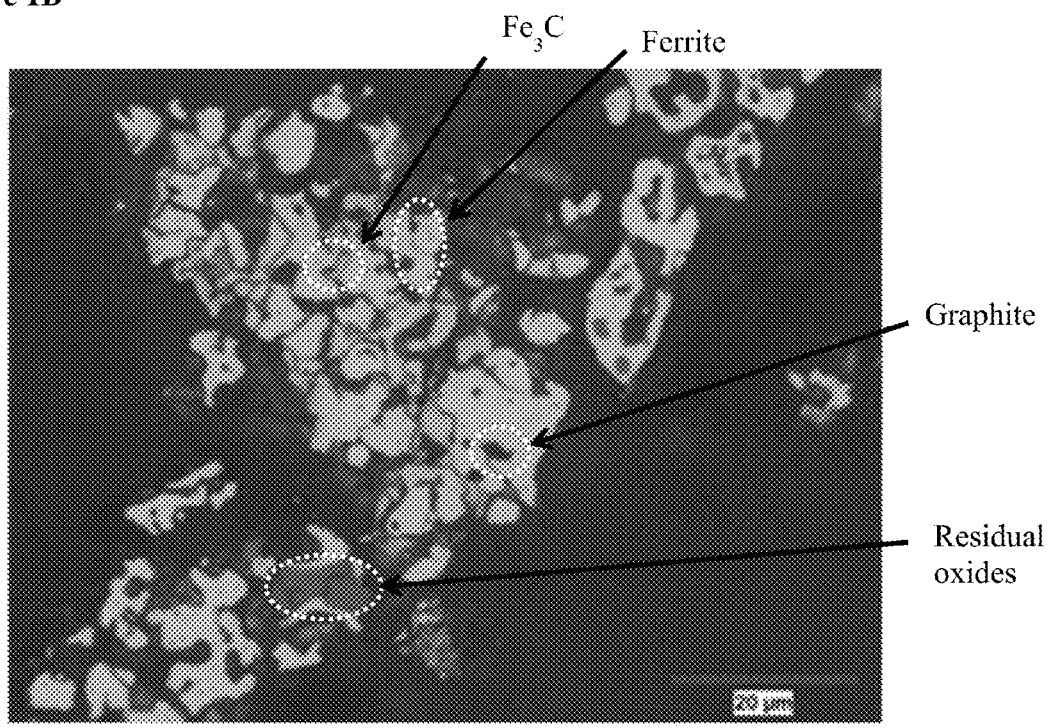

A non-limitative example of fine metal particles according to the invention includes particles composed of ferrite, graphite, iron carbides ($Fe_3C$) and residual oxides as shown in FIG. 1. For instance, the particles may have a microstructure consisting of ferrite (Fe+<0.02% w/w C) in which may be embedded tempered graphite particles and/or iron carbides ($Fe_3C$). In FIG. 1, the ferrite is seen as the main white areas, the graphite is seen as small black spots, iron carbides are seen as small white areas surrounded by a black line and residual oxides are seen as a gray zone.

In one embodiment, the fine metal particles are composed of at least 50% metallic iron derived from direct reduction processes of iron oxides (DRI) and/or derived from commercial ferrous powder manufacturing processes.

In embodiments, the fine metal particles contain at least 55% w/w, or 60% w/w, or 65% w/w, or 70% w/w, or 75% w/w, or 80% w/w, or 85% w/w, or 85% w/w, or 90% w/w, or 99%, or 99.9% w/w iron.

In one embodiment, the fine metal particles are composed of a mixture of: (i) fine ferrous material, preferably having a size 200 microns, and (ii) powder materials (e.g. metallic powders, metallic silicon, alloyed iron materials, graphite, etc.) having a particle size distribution comparable to that of (i). In another embodiment, particles are composed of a mixture of (i) and (iii) powder materials having with a particle size of 600 microns or less to a maximum of 30 weight percent of the mixture.

According to selected embodiments, the fine metal particles may comprise various ferroalloy materials including, but not limited to FeAl, FeB, FeCe, FeCr, FeMg, FeMn, FeMo, FeNb, FeNi, FeP, FeSi, FeSiMg, FeTi, FeU, FeV, FeW. Table 1 provides a non-limitative list of ferroalloys that may be added, alone or in combination, together with preferred maximum. These ferroalloys are preferably used in a fine powder form (i.e. ≤1000 microns, or ≤600 microns, or ≤200 microns).

Depending on the nature of ferroalloy(s) or its atomic elements, the mixture of fine metal particles may comprise from trace amounts to 100% w/w of the ferroalloy(s); for instance, about 0.01% w/w, or about 0.1% w/w, or about 0.5% w/w, or about 1% w/w, or about 2.5% w/w, or about 5% w/w, or about 8% w/w, or about 10% w/w, or about 15% w/w, or about 20% w/w, or about 25% w/w, or about 30% w/w, or about 35% w/w, or about 40% w/w, or about 45% w/w, or about 50% w/w, or about 55% w/w, or about 60% w/w, or about 65% w/w, or about 65% w/w, or about 70% w/w, or about 75% w/w, or about 80% w/w, or about 85% w/w, or about 90% w/w, or about 95% w/w, or about 99% w/w of ferroalloy(s), or mixtures thereof. In selected embodiments, the mixture of fine metal particles may comprise a maximum of about 5% w/w of ferroalloy(s).

TABLE 1

Examples of ferroalloys that may compose the fine iron particles

| Elements composing the ferroalloy | Preferred maximum concentration of the elements in the ferroalloy (% w/w) |
|---|---|
| Silicon | 75 |
| Manganese | 30 |
| Phosphorus | 80 |
| Chromium | 30 |
| Nickel | 55 |
| Molybdenum | 70 |
| Titanium | 70 |
| Boron | 20 |

According to selected embodiments, the fine metal particles may comprise other powder materials such as iron oxides (e.g. iron oxides comprising up to 40% of the element oxygen), cast iron comprising up to 8% of the element carbon) and SiC.

Furthermore, the fine metal particles, according to the invention, may comprise various elemental materials, including but not limited to aluminum, silver, copper, platinum, palladium, or any other suitable elemental materials or alloys thereof.

As used herein, the term "oily liquid lubricant" refers to a viscous liquid at ambient temperature (i.e. between 20° C. and 26° C.), that is both hydrophobic and lipophilic. The oily liquid lubricant may be animal, vegetable, or petrochemical in origin. In embodiments, oily liquid lubricants include those that are "slippery". Without being bound by any theory, it is believed that the oily liquid lubricant, according to the invention, forms a thin oily coating around the metal particles. During compaction, this oily coating eases the sliding of the metal particles on one another and it also encourages a rearrangement of the particles, thereby allowing a greater filling of the voids, a greater mechanical anchoring between the particles and a greater densification of the solid being formed.

Particular examples of oily liquid lubricant include, but are not limited to mineral oil (e.g. petroleum-based products from crude oil, paraffinic oils, naphthenic oils, aromatic oils), vegetal or vegetable oil (e.g. rapeseed oil (e.g. canola oil), palm oil, soybean oil, sunflower seed oil, peanut oil, cottonseed oil, palm kernel oil, coconut oil, olive oil, corn oil, grapeseed oil, hazelnut and other nut oils, linseed oil, rice bran oil, safflower oil, sesame oil, mixtures thereof, etc.), animal oils (e.g. from livestock animals like pigs, chickens and cows) and mixtures thereof. In one embodiment, the oily liquid lubricant is a vegetable oil, i.e. low erucic acid rapeseed oil (also known as canola oil crude degummed erucic acid). There is an advantage in using a vegetable oil such as canola oil that is associated with the fact that, contrary to a binder comprising molasses and lime, canola oil will not generate (or much less) nitrogen during burning in a furnace. Reducing generation of nitrogen may be useful since this gas may be harmful to steel. In another embodiment, the oily liquid lubricant is a mineral oil such as an industrial bearing and circulating oil (e.g. Shell Morlina S2 B-220™).

It is within the skill of those working in the art to identify suitable oily liquid lubricants according to the invention. For instance, depending on the fine particles being used, the mixing conditions (e.g. speed, temperature) and the desired characteristics of the final agglomerated product, etc., it may be envisioned to use oily liquid lubricants that are actually solid or semi-solid at ambient temperature including, but not limited to, hydrogenated vegetable oils, margarine, milk, butter, lard, schmaltz, drippings and the like. Accordingly, in particular embodiments, the present invention encompasses oily lubricants that are solid or semi-solid at ambient temperature and that can become liquid at higher temperature.

In embodiments, the oily liquid lubricant is blended with the fine metal particles in a concentration of less than about 10 weight percent, e.g. about ≤10% w/w, about ≤9%, w/w, about ≤8%, w/w, about ≤7%, w/w, about ≤6%, w/w, about ≤5%, w/w, about ≤4% w/w, about ≤3.5% w/w, about ≤3%, w/w, about ≤2.5% w/w, about ≤2% w/w. In preferred embodiments, the concentration of the oily liquid lubricant is between about 2 to 10% w/w, or about 3 to 8% w/w, or about 3 to 5% w/w, or about 3.5 to 4% w/w. In embodiments, the selected concentration allows a substantial uniform and thin coating of the fine metal particles after blending the fine metal particles with the oily liquid lubricant for about 5-10 minutes.

Figure 2:
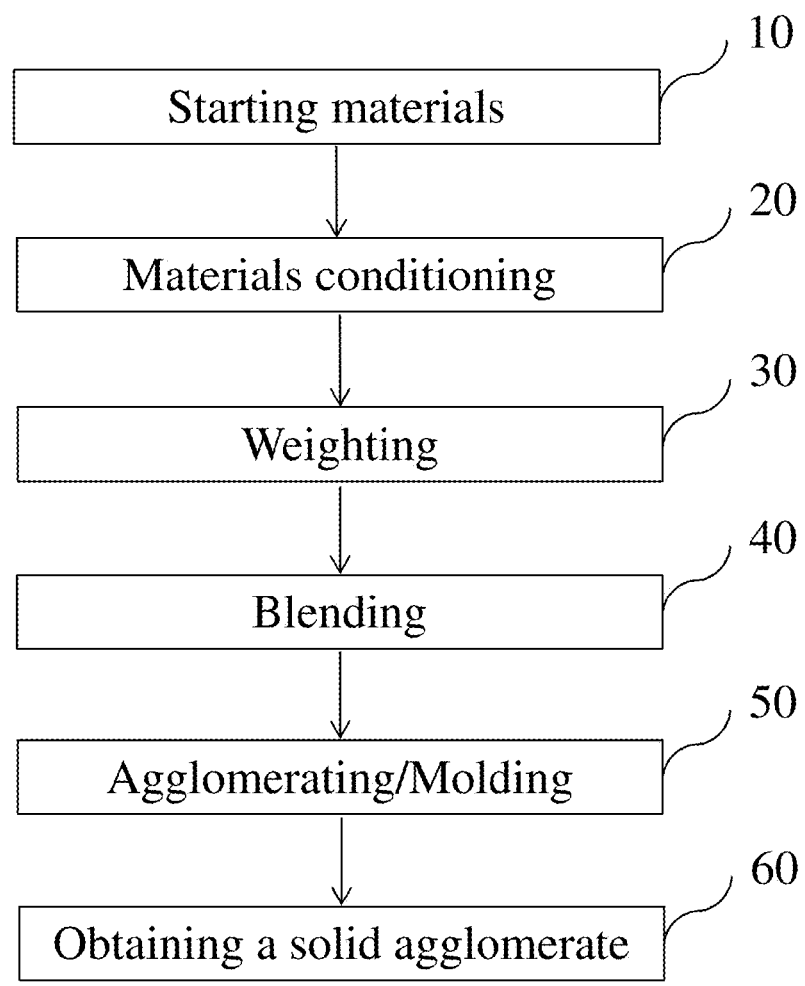
FIG. 2 is a flowchart of a method for manufacturing a solid agglomerated metal product according to an embodiment of the invention.

Referring to FIG. 2, a suitable starting metal material is obtained (10), including but not limited to pure elemental metals, ferroalloys and powders from steel mill waste or by-products, powders derived from direct reduction processes of iron oxides (DRI) and iron-containing powders from commercial ferrous powder manufacturing processes. In embodiments, the total iron content of the starting materials is at least 55% w/w, or 60% w/w, or 65% w/w, or 70% w/w, or 75% w/w, or 80% w/w, or 85% w/w, or 85% w/w, or 90% w/w, or 99% w/w, or 99.9% w/w iron.

When necessary, the starting material is conditioned (20) to comprise fine metal particles having a maximum size of about 1 mm (1000 microns), preferably about 600 microns, more preferably about 500 microns, even more preferably about 200 microns. In selected embodiments, the particles are less than 200 microns in size, typically containing at least about 50% iron and more preferably at least about 70% iron. When exhibiting a size in excess of about 1 mm, the starting metal material is milled, until a desired particle size is reached, using suitable commercially available milling/grinding devices (e.g. ball mill, disc mill etc.) such as Allis Chalmers ball mill (Milwaukee, Wis.). To ensure an optimal particle size, the starting and milled metal materials may be sieved using proper screens.

Table 2 below provides an exemplary screen analysis of coarse powder material, i.e. an iron powder water atomized in a commercial powder manufacturing plant, this coarse iron powder comprising a minimum metallic iron content of about 94% w/w and a maximum of about 6% w/w of alloying elements. Table 3 below provides an exemplary screen analysis of suitable fine metal particles, i.e. iron particles obtained from a DRI production plant comprising a minimum metallic iron content of about 60% w/w.

TABLE 2

Exemplary Screen Analysis of Coarse Powder Materials

| U.S Standard Sieves (mesh size) | | Sieve openings (microns) | Amount of particles obtained (wt %) |
|---|---|---|---|
| | +12 | >1680 | <1% |
| −12 | +30 | 600 | 7% |
| −30 | +50 | 300 | 30% |
| −50 | +100 | 150 | 62% |
| −100 | | <150 | <1% |

TABLE 3

Exemplary Screen Analysis of Fine Metal Particles from DRI

| U.S Standard Sieves (mesh size) | | Sieve openings (microns) | Amount of articles obtained (wt %) |
|---|---|---|---|
|  | +12 m | >1680 | 0% |
| −12 | +30 m | 600 | 0% |
| −30 | +45 m | 354 | 0% |
| −45 | +70 m | 210 | 1% |
| −70 | +100 m | 150 | 2% |
| −100 | +140 m | 105 | 3% |
| −140 | +270 m | 53 | 14% |
| −270 | +325 m | 45 | 6% |
| −325 |  | <45 | 75% |

Next, the metallic materials are weighed (30), and combined if more than one, in order to obtain a desired composition and an obtained desired proportions of the metal(s).

The weighed materials comprising the fine metal particles are then blended (40) with the oily liquid lubricant to obtain an oily metallic mixture. Such blending may take place in a suitable rotating blender/mixer. Examples of known commercially available rotating blenders or mixers includes Eirich mixers (e.g. models DE14™, DE18™ and DE22™), drum mixers (Munson type rotary batch mixer), V-blenders and double-cone blenders. In a preferred embodiment, the metallic materials (i.e. fine metal particles) are charged in the blender/mixer first and a desired quantity of oily liquid lubricant is added gradually while mixing. Blending is carried out until acceptable homogenization of the materials is obtained, preferably when there is no more dusting of fine materials in the blending/mixing device and that no agglomeration of the particles is detected by visual inspection. Blending duration may vary according to multiple variables such as the nature, size and relative proportions of the particles and lubricant, the amount of materials in the blender/mixer, the temperature, the mixing speed, etc. Typically 5-10 minutes are sufficient to obtain an homogeneous distribution of the oily liquid lubricant with the metallic materials in the blender of an Eirich mixer. More time (e.g. about 20 min.) may be required in a drum mixer.

It may also be possible to add additional ingredients to the blend, including but not limited to, reductant materials (e.g. carbon units such as graphite, coke, anthracite, etc.), waxes (e.g. Acrawax™), starch, zinc stearate, sodium silicate, lime, etc.

Figure 3:
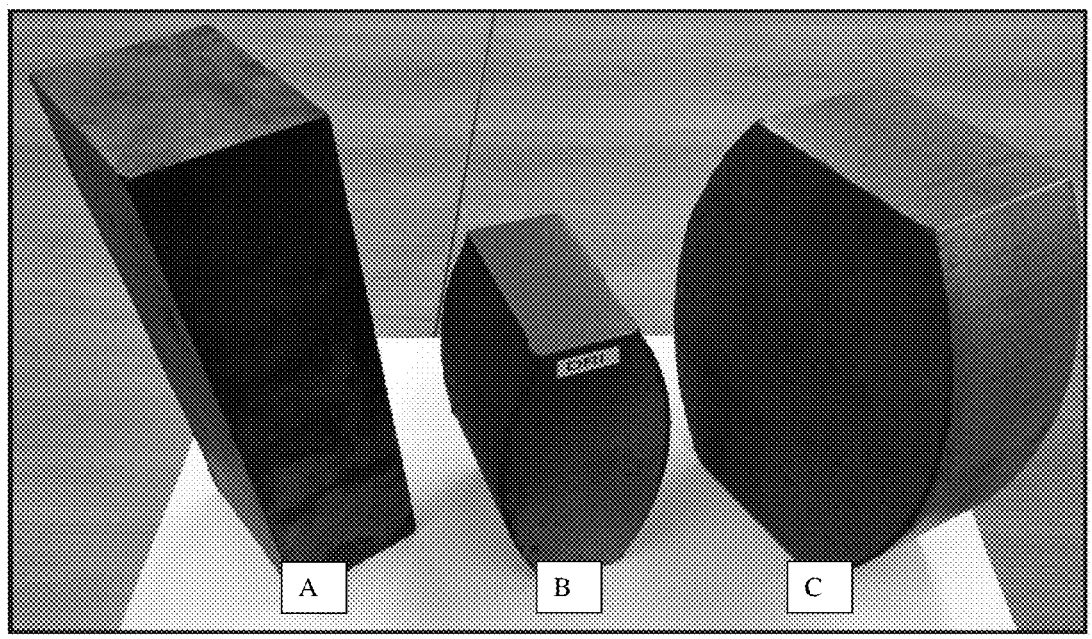
FIG. 3 is a panel showing a picture and providing dimensions of different shapes of agglomerated metal products according to particular embodiments of the invention.
Figure 4A:
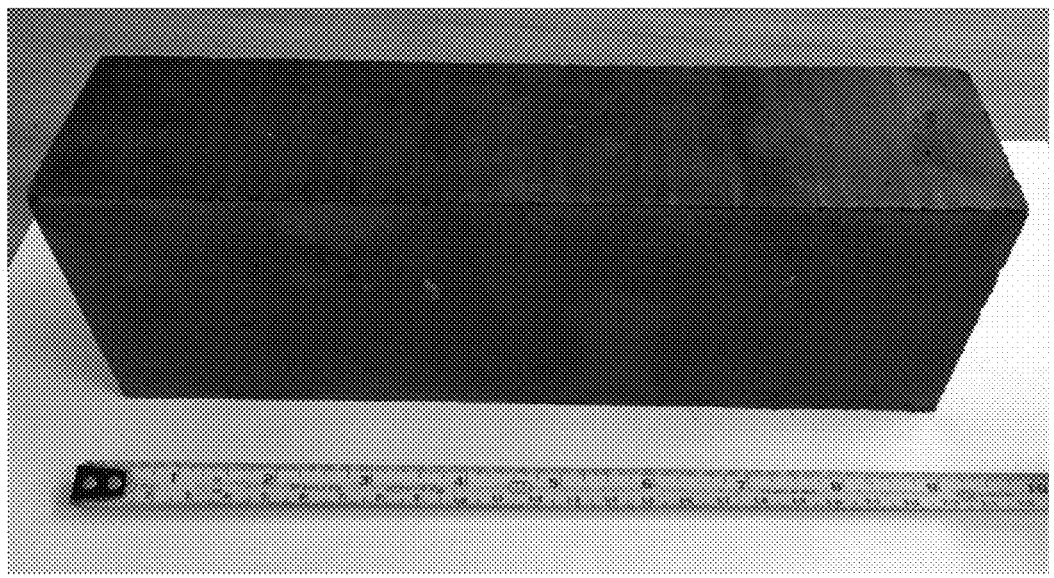
FIGS. 4A-4D display pictures of agglomerated metal products of different shapes according to particular embodiments of the invention.
Figure 4B:
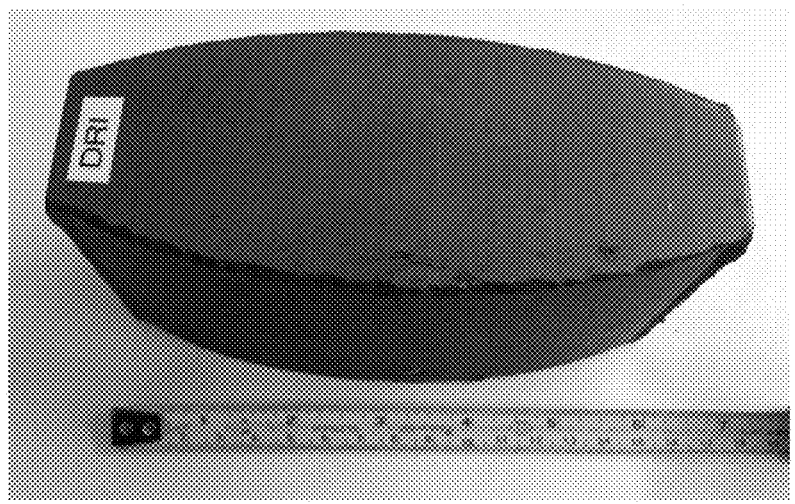
Figure 4C:
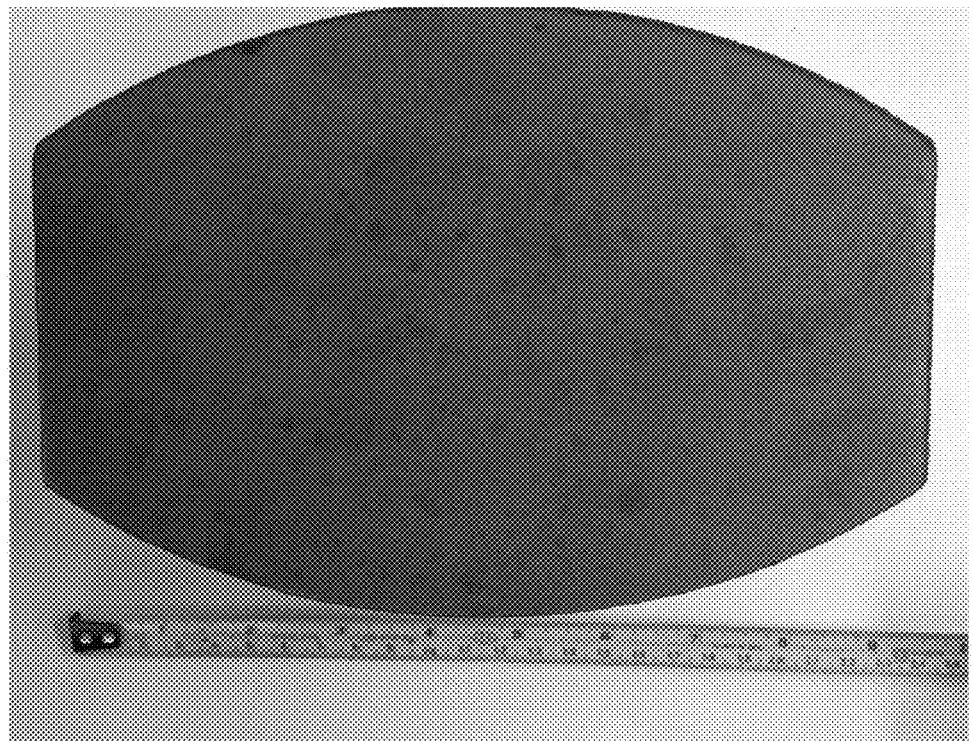
Figure 4D:
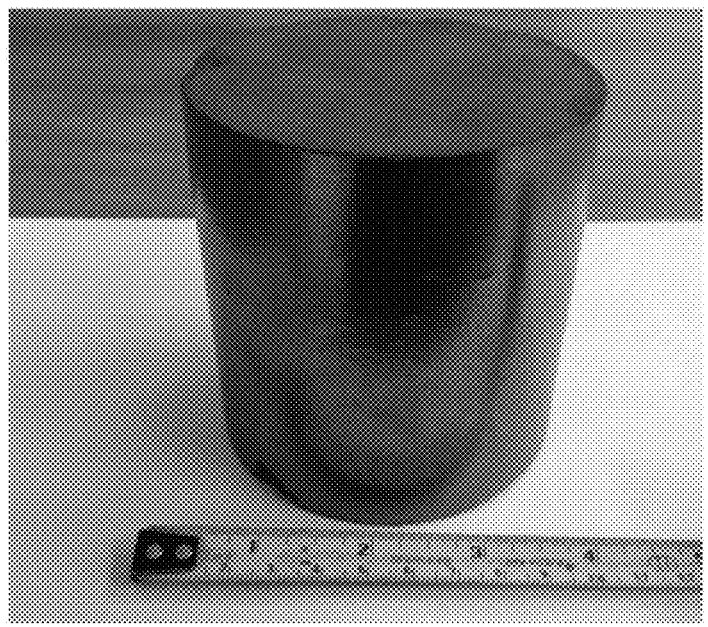
Figure 5:
FIG. 5 is a picture of briquettes composed of lime and molasses according to Example 7.

The oily metallic mixture of blended materials is then transferred to a compacting device for agglomeration and molding (50) into a solid metal product. The solid agglomerate may have any desired shape including, but not limited to, the shape of a briquette, a brick, a ball, a block, a puck, a cube or cuboid, a circle, an oval, an ellipse, a frustum, a triangle, etc. Selected examples are shown in FIGS. 3, 4 and 5. In preferred embodiments, the solid agglomerate has a shape of Type A, Type B or Type C.

In one embodiment, the oily metallic mixture of blended materials is fed from a storage or feeding device to die or mold cavities having a desired shape and having a capacity adjusted as a function of the finished product height. Once in the mold, a punch of a shape matching the die/mold cavity is driven down into the cavity, thereby applying a gradually increasing pressure to the mixture. Pressure is maintained at a desired level and for a given time (e.g. 1, 2, 3, 4, 5 seconds or more).

In preferred embodiments, the compacting (50) comprises a degassing step. After applying a certain pressure to the mixture for a given time, the pressure is relaxed to allow the air entrapped in the cavity to escape. The pressure is then reapplied on the material. This degassing step may be repeated a few times (1, 2, 3 times or more) during the compaction cycle.

The cycle time of the compacting step may vary according to various factors, including for instance the properties of the blended materials and the operating characteristics of the press. In embodiments, the duration of the compacting step is less than 30 seconds, preferably less than 20 seconds.

When the compacting is completed, the pressure is released and an agglomerate in a solid form is obtained (60). The solid agglomerate (e.g. a brick) is then ejected from the die/mold cavity and sent to a storage area (e.g. pile or bulk). In embodiments the solid agglomerate has a density 3 g/cm$^3$, for instance a density between about 3.5 to 6 g/cm$^3$, or a density between about 4 to 5.5 g/cm$^3$.

In preferred embodiments, the compacting device is capable of applying substantially high compacting pressures to the blended materials. In embodiments, pressures greater than 100 MPa, preferably ≥145 MPa (e.g. between about 145 to about 350 MPa or about 150 to about 275 MPa) are selected. Such pressures or higher pressures may be desirable in order to obtain a solid agglomerate that exhibits a resistance and a strength sufficient for subsequent batch handling without significant dusting and/or fracture. In one embodiment, the compacting device is a hydraulic press having a pressing capacity of up to 2000 metric tons. Such hydraulic press is capable of molding solid agglomerate into bricks measuring 154 mm×76 mm×70 mm (Type B; FIGS. 3 and 4B). Of course, the invention is not limited to any particular type of compacting device, and various types of mechanical or hydraulic presses having greater or lower pressing capacity may also be used. In examples described hereinafter, Leiss™ hydraulic presses having a capacity 800, 1000, 1250 or 2000 metric tons were used. Additional examples of hydraulic presses available on the market include Sacmi™ hydraulic presses and Boyd™ mechanical presses.

An advantage of the solid agglomerates obtained, according to the preferred embodiments described herein, is such agglomerates possess a desirable density, a suitable resistance to crumbling and dusting during handling. The solid agglomerates can also resist to stresses at high temperature in the industrial processes to which they are destined. Those industrial processes include electric arc furnaces, oxygen converters, cupolas, blast furnaces and electric induction furnaces, although their usage may not be limited to these processes. For instance, when used as a feed material to an electric arc steelmaking furnace, the high strength agglomerate holds together and penetrates the slag layer easily in the molten metal bath of the steelmaking furnace. In addition, agglomerates comprising high compression strength may also advantageously be charged into cupola furnaces without disaggregating instantaneously when other materials are charged above them. These solid agglomerates further possess a low humidity index and are thus substantially resistant to weathering such that they may not require indoor storage for preserving their integrity.

Those skilled in the art will recognize, or be able to ascertain using no more than routine experimentation, numerous equivalents to the specific procedures, embodiments, claims, and examples described herein. Such equivalents are considered to be within the scope of this invention and covered by the claims appended hereto. The invention is further illustrated by the following example, which should not be construed as further or specifically limiting.

EXAMPLES

The Examples set forth herein below provide exemplary methods in the manufacture of solid agglomerates in the form of bricks having different shapes, and they provide results showing properties such as bricks having various composition.

Example 1: Characterization Procedures

The physical and chemical properties of an agglomerated metal product according to the invention may be characterized using any suitable method or technique known in the art. Below are non-limitative examples of such methods or techniques.

1. Density
a) Physical Measurement

For an agglomerate of a symmetrical shape (e.g. Shape A shown in FIGS. 3 and 4A), the density may be determined by weighing the agglomerate on a precision scale and measuring the width, the height and the thickness of the agglomerate to calculate its volume. The density is obtained by dividing the weight of the agglomerate by its volume.

b) Water Immersion Measurement

For an agglomerate having a more complex geometry (e.g. Shapes B and C shown in FIGS. 3 and 4, and for briquettes shown in FIG. 5), a water immersion technique may be used to determine density. The agglomerates are weighed on a precision scale; they are then immersed in water at room temperature in a vessel with volumetric graduations and the volume of water being displaced is recorded as the volume of the agglomerate or briquette. The density is then calculated by dividing the dry weight of the agglomerate or briquette by the volume of water displaced.

2. Handling Resistance

A handling resistance index was developed. During this test, the agglomerated metal product was dropped on a hard cement base from a height of about 1.5 meters. The handling resistance index was then defined as follows:

High resistance (i.e. index of 1): The agglomerate does not crack or rupture after the first test; it may rupture in 4 pieces or less after the second drop test.

Acceptable resistance (i.e. index of 2): The agglomerate cracks or ruptures in 6 pieces or less after the first drop test.

Weak resistance (i.e. index of 3): the agglomerate ruptures in more than 6 pieces after the first drop test.

3. Water Absorption

A water absorption index was developed to measure susceptibility to water absorption. Briefly, the agglomerated metal product was weighed before a full immersion in a bucket containing about 20 liters of water for about 24 to 48 hours at room temperature. After removing the agglomerate from the bucket, surface water was wiped out using an absorbing paper in order to remove any excess from the surface and the agglomerate was weighed a second time. The water absorption index is defined as the difference between the weight of the agglomerate before and the weight after immersion, the index being expressed as a percentage of the dry weight of the agglomerate. For instance, if the dry weight is 1 kg and the wet weight is 1.5 kg, the water index is 50% (i.e. $[(1.5-1.0)/1] \times 100$).

4. Compression Resistance

Compression resistance was measured with a standard tensile test machine having parallel platens and being capable of working as a compression tester (e. g. Satec Systems inc., model T20000™, Grove City, Pa.). For such measurements, specimens with parallel faces totalling about 4 cm$^2$ to about 25 cm$^2$ were obtained, the surface area varying with the size/shape of the agglomerate. These specimens were cut from the agglomerate and typically, three specimens were cut from each agglomerate. The cut specimens were then placed between the parallel platens of the machine and an increasing load was applied on the specimens until failure was visually observed. The compression resistance is a value in MPa and corresponds to the maximum load (in Newton) that was applied on the specimen until its fracture, divided by the specimen surface area (in square meters).

5. High Temperature Cohesion Strength

In order to verify the high temperature cohesion strength of the agglomerated metal products, agglomerates were placed under ambient atmosphere in an electric furnace capable of reaching temperatures in excess of 1200° C. (Thermo Fisher Scientific, Thermolyne Furnace Benchtop Industrial Type FD1500M™, Asheville, N.C.). The agglomerates were gradually heated up to 1200° C., at a rate of approximately 20° C. per minute. At each interval of 200° C. (i.e. 200° C., 400° C., 600° C., 800° C., 1000° C. and 1200° C.), the agglomerates were taken out of the furnace for about 2 minutes and placed on a refractory plate to be examined visually. The agglomerates were also roughly manipulated to check that no fragmentation or dusting occurred. After the 1200° C. treatment, samples were cut in two in order to compare cross-section structures of agglomerates before and after heating.

Example 2: Bricks Having a Type B Shape and Comprising Canola Oil

Fine metal particles of a diameter of less than 200 microns produced by direct reduction of iron oxide and containing about 80% metallic iron were admixed with 3 weight percent of a vegetable oily lubricant (canola oil, product code: CanOD) and were blended for about 5 minutes in a Eirich mixer. The resulting homogeneous oily metallic blend was fed to the four cavities of a 2000 tons capacity press, the mold cavities being shaped to produce bricks having a shape of "Type B" as shown in FIGS. 3 and 4B. A pressure of 275 MPa was applied on the oily metallic blend found in the mold cavities.

The properties of resulting bricks were measured using the characterization procedures of Example 1. Briefly, one or two bricks were characterized. The average weight was about 2.4 kg and the average density was about 4.05 g/cm$^3$ as measured by the water immersion technique. The water absorption index was 0.2%. The handling resistance index was 1 with no fracture of the brick after the initial drop on the concrete base.

Figure 6A:
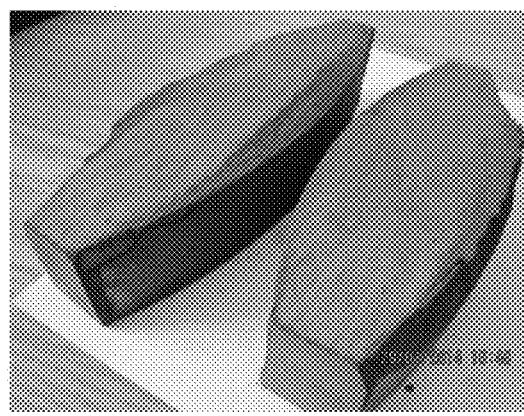
FIGS. 6A-6B display pictures showing cross-sections of an agglomerated metal product of Type B before (FIG. 6A) and after (FIG. 6B) heating up to 1200° C.
Figure 6B:
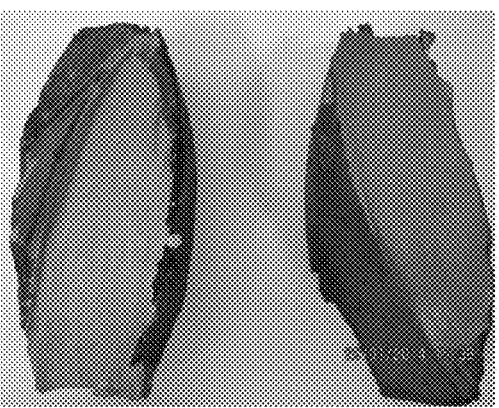

The calculated compression resistance of the bricks was 31 MPa. The high temperature cohesion strength test showed no significant fragmentation of the bricks at any of the measured temperatures. As shown in FIG. 6, visual inspection of the internal structures of bricks, before and after heating up to 1200° C., revealed no deterioration of the bricks during the heating cycle. Interestingly, a densification by sintering was observed.

Example 3: Bricks Having a Type B Shape and Comprising Mineral Oil

Fine metal particles of a diameter of less than 200 microns, produced by direct reduction of iron oxide and containing about 80 weight percent metallic iron, were admixed with 3 weight percent mineral oil (Product id.: Shell Morlina S2 B-220) and it was blended for about 5 minutes in a Eirich mixer. The resulting homogeneous oily blend was fed to the four cavities of a 2000 ton capacity press, the mold cavities being shaped to produce bricks having a shape of "Type B" as shown in FIGS. 3 and 4B. A pressure of 275 MPa was applied on the oily blend.

The properties of resulting bricks were measured using the characterization procedures of Example 1. Briefly, the average weight was about 2.4 kg and the average density was about 4.05 g/cm$^3$ as measured using the water immersion technique. The handling resistance index was 1 with no fracture of the agglomerates after the initial drop on concrete.

Example 4: Bricks Having a Type C Shape and Comprising Alloyed Iron

Bricks were made using a blend comprising 80 weight percent of fine metallic iron particles (size of less than about 200 microns) and 20 weight percent of iron (Fe+0.28% Mn w/w+0.45% Ni w/w+0.60% w/w Mo; size of less than 600 microns). The blend was admixed with 4.2 weight percent of an oily vegetable lubricant (canola oil product code: CanOD) and it was blended for about 5 minutes in an Allis Chalmers ball mill. The resulting homogeneous oily blend was fed to the four cavities of a 2000 ton capacity press with mold cavities being shaped to produce bricks having a shape of "Type C" as shown in FIGS. 3 and 4C. A pressure of 195 MPa was applied on the composite oily blend.

The properties of resulting bricks were measured using the characterization procedures of Example 1. Briefly, the bricks had an average weight of about 3.6 kg and an average density, as measured by the water immersion technique, of about 4.57 g/cm$^3$. The handling resistance index was 1 with no fracture of the agglomerates after the initial drop on concrete.

Example 5: Effect of Various Concentrations of a Vegetable Oily Lubricant

Bricks were made according to the procedure described in Example 2, the difference being that the fine metal particles were admixed with various amounts of canola oil. The properties of the bricks that were produced are presented in Table 4.

TABLE 4

Properties of bricks comprising various amounts of canola oil

| Canola oil (% w/w) | Shape Type | Pressure Applied (MPa) | Weight (kg) | Density (g/cm$^3$) | Handling Resistance* | Compression Resistance (MPa) |
|---|---|---|---|---|---|---|
| 3.0 | B | 200 | 2.4 | 4.05 | 2 | — |
| 3.0 | B | 230 | 2.4 | 4.05 | 2 | — |
| 3.0 | B | 275 | 2.4 | 4.05 | 1 | 31 |
| 3.5 | B | 315 | 2.7 | 4.23 | 1 | — |
| 4.2 | C | 195 | 3.6 | 4.29 | 1 | — |
| 4.2 | A | 195 | 5.3 | 4.04 | 2 | 22 |
| 10 | B | 260 | 3.5 | 4.00 | 3 | — |

*1 = High; 2 = Acceptable; 3 = Weak

The results presented in Table 1 show that increasing the pressure applied on materials comprising 3 weight percent canola oil had no detectable effect on the final density of the agglomerates (i.e. stable at 4.05 g/cm$^3$) but it had a positive effect on handling resistance (from an index of 2 (acceptable) to an index of 1 (high)). Of course, a handling resistance index of 1 is preferable for the handling of bricks in order to avoid, or at least minimize, their breakage in a normal industrial handling (e.g. a drop from a charging or discharging device).

To a certain extent, it was possible to increase the final density of the agglomerates by both, increasing the amount of oil (from 3% w/w to 3.5% w/w) and by increasing the pressure applied (from 200 MPa to 315 MPa). Increasing the amount of oily liquid lubricant from 3 weight percent up to 10 weight percent had no impact on the density (starting at 4.05 g/cm$^3$ to end at about 4.00 g/cm$^3$).

Changing the geometry of the agglomerates while maintaining a similar density may require modifying the concentration of the oily liquid lubricant. For example, by applying the same compacting pressure of 195-200 MPa to "Type B" and "Type A" bricks required increasing the content of oily liquid lubricant from 3.0% w/w to 4.2% w/w in order to reach the same density of about 4.00-4.05 g/cm$^3$.

The highest density level (4.29 g/cm$^3$) was achieved by using a mixture comprising 4.2% w/w oil and "Type C" bricks, these bricks showing also the highest resistance (index of 1). Interestingly, such a high density was obtained despite the lowest pressure tested (195 MPa). The same amount of oil and pressure was also used to obtain bricks of "Type A" but these bricks showed less resistance (index of 2). This may be due to the fact that bricks of Type A are more massive and heavier.

Example 6: Effect of Various Blends of Particles and Alloying Elements

Bricks were made according to the procedure described in Example 4, with the difference that various types of particles and additives were mixed in different proportions. The mixes of metal particles comprised fine iron particles (i.e. particles of less than about 200 microns) blended with various additives. The various mixes were combined with variable amounts of canola oil (product code CanOD). The properties of the bricks so produced are presented in Table 5.

TABLE 5

Properties of bricks comprising various mixes of metal particles and alloying elements

| Fine Iron particles (% w/w) | Additive Admixed (amount in % w/w) | Maximum size of the particles in the additive (microns) | Canola oil (% w/w) | Shape Type | Pressure (MPa) | Density (g/cm³) | Handling Resistance* |
|---|---|---|---|---|---|---|---|
| 90 | Fe** (10) | <600 | 4 | B | 145 | 4.89 | 1 |
| 85 | Fe** (15) | <600 | 4 | B | 170 | 4.99 | 1 |
| 80 | Fe** (20) | <600 | 4.2 | B | 145 | 4.57 | 1 |
| 80 | Fe** (20) | <600 | 4.2 | A | 305 | 4.24 | 3 |
| 70 | Fe** (30) | <600 | 3.5 | B | 170 | — | 1 |
| 50 | Fe** (50) | <600 | 3.5 | B | 170 | 5.22 | 3 |
| 97 | Graphite (3) | <60 | 3 | B | 170 | — | 1 |
| 92 | Graphite (8) | <60 | 3 | B | 200 | 4.05 | 1 |
| 82 | Graphite (18) | <60 | 3 | B | 230 | — | 3 |
| 95 | FeSi$_{75}$ (5) | <300 | 3.5 | B | 170 | — | 1 |
| 89 | FeSi$_{75}$ (11) | <300 | 3.5 | B | 230 | — | 1 |
| 80 | FeSi$_{75}$ (20) | <300 | 3.5 | B | 230 | — | 1 |
| 97 | Si (3.5) | <200 | 3.5 | B | 230 | 4.30 | 1 |
| 95 | Si (5) | <200 | 3.5 | B | 230 | 4.11 | 2 |
| 80 | Si (20) | <200 | 3.5 | B | 230 | — | 3 |

*1 = High; 2 = Acceptable; 3 = Weak
**Iron powder comprising a minimum metallic iron content of about 94% w/w and a maximum of 6% w/w of alloying elements.

The results presented in Table 5 show that it is possible to admix up to 30 weight percent of iron particles having a maximum size of ≤600 microns and also to admix up to 50 weight percent of iron particles having a maximum size of about ≤200 microns, without compromising the handling resistance of the agglomerate produced.

The results presented in Table 5 further show that it is still possible to obtained useful iron-based agglomerates when adding additives such as graphite, FeSi$_{75}$ and Si. For instance, the handling resistance of the agglomerate produced was not compromised (i.e. Resistance index of 1) when adding up to 8% w/w graphite, up to 20% w/w FeSi$_{75}$ and up to 3.5% w/w Si.

As shown previously for Example 5, for the same type of metal (Fe) and the same amount of oil (4.2% w/w), agglomerates of "Type A" are more fragile than "Type B" (handling resistance index of 3 vs 1).

Example 7: Comparison with Briquettes Comprising Lime and Molasses

Bricks comprising canola oil, according to the present invention, were compared with well-known briquettes comprising lime and molasses.

Briefly, fine metal particles from DRI were mixed with 5% w/w lime and 17% w/w molasses as a binder. Briquettes comprising this binder were manufactured according to a standard procedure and a commercially available briquetting machines (Bepex Corporation, model MSS 20.5™). FIG. 5 shows a picture of typical briquettes obtained.

The properties of the lime/molasses briquettes were compared to those of the bricks manufactured according to the procedure of Example 2. A comparative analysis is presented in Table 6.

TABLE 6

Comparative analysis of lubricant-containing bricks vs. known briquettes

| Iron Particles (% w/w) | Lubricant or Binder | Density (g/cm³) | Handling Resistance* | Compression Resistance (MPa) | Humidity Index |
|---|---|---|---|---|---|
| 100 | Canola oil (3% w/w) | 4.05 | 1 | 31 | 0.2 |
| 100 | Lime (5% w/w) + Molasses (17% w/w) | 3.30 | 1 | 9.4 | 7.1 |

*1 = High; 2 = Acceptable; 3 = Weak

The results presented in Table 6 show that agglomerates manufactured, according to the present invention and comprising an oily liquid lubricant, exhibit a much greater compressive resistance than commercially available briquettes comprising lime and molasses.

The agglomerates, according to the present invention, also have a much lower humidity index (about 35 times less) compared to lime and molasses briquettes. This feature is highly advantageous because an agglomerate having a low humidity index is more resistant to weathering.

Example 8: Briquettes Comprising Starch

Briquettes were made using starch as a binder of the fine metal particles. Briefly, fine metal particle materials produced by an iron oxide reduction process and comprising a metallic iron content of about 80 weight percent were admixed with up to 10 weight percent starch (ADM-SDU-E Low Viscosity High Protein Wheat Starch). The briquettes were made according to the procedures described in Example 2, but using starch instead of oil. Results are presented in Table 7.

TABLE 7

Properties of briquettes comprising starch

| Starch (% w/w) | Shape Type | Pressure (MPa) | Density (g/cm$^3$) | Handling Resistance* |
|---|---|---|---|---|
| 3 | A | 170 | 3.33 | 3 |
| 5 | A | 105 | 2.95 | 3 |
| 10 | A | 135 | 3.01 | 3 |
| 10 | A | 170 | 3.19 | 3 |

*1 = High; 2 = Acceptable; 3 = Weak

As seen in Table 7, using starch as a binder failed to produce agglomerates with high handling resistance.

Headings are included herein for reference and to aid in locating certain sections. These headings are not intended to limit the scope of the concepts described therein under, and these concepts may be applicable in other sections throughout the entire specification. Thus, the present invention is not intended to be limited to the embodiments shown herein but is to be accorded the widest scope consistent with the principles and novel features disclosed herein.

As used herein and in the appended claims, the singular forms "a", "an", and "the" include plural referents unless the context clearly indicates otherwise. Thus, for example, reference to "an oil" includes one or more of such oils, and reference to "the method" includes reference to equivalent steps and methods known to those of ordinary skill in the art that could be modified or substituted for the methods described herein.

Unless otherwise indicated, all numbers expressing quantities of ingredients, reaction conditions, concentrations, properties, and so forth used in the specification and claims are to be understood as being modified in all instances by the term "about". At the very least, each numerical parameter should at least be construed in light of the number of reported significant digits and by applying ordinary rounding techniques. For instance, in the industry to which the invention pertains, it is common to accept a variation of 10% in the size of particles (ASTM standards). Accordingly and unless indicated to the contrary, the numerical parameters set forth in the present specification and attached claims are approximations that may vary depending upon the properties sought to be obtained. Notwithstanding that the numerical ranges and parameters setting forth the broad scope of the embodiments are approximations, the numerical values set forth in the specific examples are reported as precisely as possible. Any numerical value, however, inherently contains certain errors resulting from variations in experiments, testing measurements, statistical analyses and so forth.

It is understood that the examples and embodiments described herein are for illustrative purposes only and that various modifications or changes in light thereof will be suggested to persons skilled in the art. The scope of the claims should not be limited by the preferred embodiments set forth in the examples but should be given the broadest interpretation consistent with the description as a whole.

The invention claimed is:

1. A solid agglomerate of metal particles comprising:
a mixture of fine metal particles consisting essentially of Direct Reduced Iron (DRI), said mixture comprising metal particles having a maximum size of about 1 mm; and
about 2.5% w/w to about 10% w/w of a liquid oily lubricant which is liquid at ambient temperature;
wherein said fine metal particles and said liquid oily lubricant are mixed and compacted together to form said solid agglomerate.

2. The agglomerate of claim 1, wherein the liquid oily lubricant is a mineral oil, a vegetable oil or an animal oil.

3. The agglomerate of claim 2, wherein the vegetable oil is canola oil.

4. The agglomerate of claim 1, wherein said fine metal particles consist of a mixture of particles, said mixture having no more than 30% w/w of particles with a size greater than about 200 microns.

5. The agglomerate of claim 1, wherein said solid agglomerate has a density of about 4 g/cm$^3$ to about 6 g/cm$^3$.

6. The agglomerate of claim 1, wherein said solid agglomerate has a shape selected from the group consisting of a briquette, a brick, a ball, a block and a puck.

7. The agglomerate of claim 1, wherein said solid agglomerate can retain its physical integrity at temperature up to 1200° C.

8. The agglomerate of claim 1, wherein said solid agglomerate is used as a charge material for a steel plant, a blast furnace and/or a foundry.

9. A solid agglomerate of metal particles consisting essentially of:
a mixture of fine metal particles, said mixture comprising metal particles having a maximum size of about 1 mm; and
about 2.5% w/w to about 10% w/w of a liquid oily lubricant which is liquid at ambient temperature;
wherein said fine metal particles and said liquid oily lubricant are cold pressed together at ambient temperature to form said solid agglomerate; and wherein said solid agglomerate has a density of about 4 g/cm$^3$ to about 6 g/cm$^3$.

10. A solid agglomerate of metal particles comprising:
a mixture of fine metal particles consisting essentially of Direct Reduced Iron (DRI), said mixture comprising metal particles having a maximum size of about 1 mm; and
a liquid oily lubricant which is liquid at ambient temperature;
wherein said fine metal particles and said liquid oily lubricant are mixed and compacted together to form said solid agglomerate, and
wherein said solid agglomerate has a density of about 4 g/cm$^3$ to about 6 g/cm$^3$.

11. The agglomerate of claim 10, wherein the liquid oily lubricant is a mineral oil, a vegetable oil or an animal oil.

12. The agglomerate of claim 11, wherein the vegetable oil is canola oil.

13. The agglomerate of claim 10, wherein the liquid oily lubricant is present at about 2.5% w/w to about 10% w/w.

14. The agglomerate of claim 10, wherein said fine metal particles consist of a mixture of particles, said mixture having no more than 30% w/w of particles with a size greater than about 200 microns.

15. The agglomerate of claim 10, wherein said solid agglomerate has a shape selected from the group consisting of a briquette, a brick, a ball, a block and a puck.

16. The agglomerate of claim 10, wherein said solid agglomerate can retain its physical integrity at temperature up to 1200° C.

17. The agglomerate of claim 10, wherein said solid agglomerate is used as a charge material for a steel plant, a blast furnace and/or a foundry.

18. A method for agglomerating fine metal particles, comprising:
   mixing fine metal particles with a liquid oily lubricant to obtain an oily metallic mixture, wherein said metal particles have a maximum size of about 1 mm and wherein said liquid oily lubricant is liquid at ambient temperature;
   pouring the oily metallic mixture into a cavity or mold; and
   cold pressing at ambient temperature the oily metallic mixture into a desired shape to obtain an agglomerate in a solid form.

19. The method of claim 18, wherein the cold pressing comprises applying to the oily metallic mixture a pressure of at least about 145 MPa.

20. The method of claim 18, wherein the cold pressing comprises a degassing step.

21. The method of claim 18, wherein the agglomerate in a solid form has a shape selected from the group consisting of a briquette, a brick, a ball, a block and a puck.

22. The method of claim 18, wherein the fine metal particles comprise at least 70% w/w total iron.

23. The method of claim 18, wherein the fine metal particles comprise at least 0.5% w/w metallic iron.

24. A method for manufacturing a solid ferrous brick, comprising:
   mixing fine powdered ferrous material with an oil to obtain an oily ferrous mixture, wherein said fine powdered ferrous material comprises at least 50% metallic iron derived from direct reduction processes of iron oxides (DRI);
   pouring the oily ferrous mixture into a mold; and
   cold pressing at ambient, temperature to apply a pressure of at least 145 MPa to the oily ferrous mixture in the mold to obtain said solid ferrous brick.

25. A method to feed a steelmaking furnace or a foundry furnace comprising:
   providing an agglomerate according to claim 1; and
   charging said agglomerate to a molten metal bath of the steelmaking furnace or the foundry furnace.

* * * * *